Jan. 24, 1956        E. F. REEDY        2,732,550

DISPLAY INSTRUMENT FOR RADIO NAVIGATION SYSTEMS

Filed July 30, 1954        7 Sheets-Sheet 1

INVENTOR
EUGENE F. REEDY
BY
ATTORNEY

Jan. 24, 1956     E. F. REEDY     2,732,550
DISPLAY INSTRUMENT FOR RADIO NAVIGATION SYSTEMS
Filed July 30, 1954     7 Sheets-Sheet 4

INVENTOR
EUGENE F. REEDY
BY
ATTORNEY

Jan. 24, 1956  E. F. REEDY  2,732,550
DISPLAY INSTRUMENT FOR RADIO NAVIGATION SYSTEMS
Filed July 30, 1954  7 Sheets-Sheet 6

INVENTOR
EUGENE F. REEDY
BY
R. V. Craddock
ATTORNEY

Jan. 24, 1956  E. F. REEDY  2,732,550
DISPLAY INSTRUMENT FOR RADIO NAVIGATION SYSTEMS
Filed July 30, 1954  7 Sheets-Sheet 7

Fig. 10.

INVENTOR
EUGENE F. REEDY
BY
R. J. Craddock
ATTORNEY

United States Patent Office 2,732,550
Patented Jan. 24, 1956

2,732,550
DISPLAY INSTRUMENT FOR RADIO
NAVIGATION SYSTEMS

Eugene F. Reedy, Merrick, N. Y., assignor to Sperry Rand Corporation, a corporation of Delaware Application July 30, 1954, Serial No. 446,753

20 Claims. (Cl. 343—107)

This invention relates to aircraft navigation instrumentation and more particularly to a navigation instrument of the type which displays to the pilot a pictorial presentation of the position and direction of flight of the aircraft relative to a predetermined or selected ground track defined by a selected radio beam. The instrument of the present invention may be employed as a piloting aid for the manual control of the aircraft by the pilot or as an instrument for enabling the pilot to monitor the control of the aircraft by an automatic pilot.

The primary object of the present invention resides in the provision of a clear, accurate, unambiguous, and much more realistic pictorial presentation of aircraft position and direction of travel with respect to selected radio beams than has heretofore been provided by similar instruments.

Another important object of the present invention is the provision of an improved aircraft indicator for indicating to the pilot not only the displacement of the aircraft from a selected radio course but also, and by the same indicating element or member, whether or not the aircraft is proceeding toward or away from the selected radio range station providing the radio course. The indicator includes a pointer which is displaced from a reference index in an amount proportional to the magnitude and displacement of the aircraft from the radio-defined course and which, by its shape, also indicates the direction of propagation of the radio waves defining the radio course. Thus, as the aircraft is approaching the selected station the pointer will not only indicate to the pilot the direction and extent of deviation of the aircraft from the selected course but will also indicate to the pilot that he is approaching the station, and, as the aircraft passes over the station the pointer will be reversed substantially 180° and at a relatively fast rate thereby conspicuously indicating to the pilot that the aircraft, in fact, has passed the station and that he is proceeding outbound therefrom, the pointer continuing to indicate the direction and sense of displacement of the craft from the outbound radio course.

Another object of the present invention resides in the provision of an improved nagivation instrument which provides an indication to the pilot not only to the magnitude and sense of displacement of the craft from a predetermined radio range or localizer beam and the direction of travel of the aircraft relative thereto but also provides an indication of the magnitude and sense of the displacement of the aircraft from a glide slope beam by the displacement of a glide slope pointer above and below a reference index in the instrument. However, when the aircraft radio receiving apparatus is tuned to a frequency other than a localizer frequency, the glide slope pointer is automatically stowed or held out of view of the pilot.

Still another object of the present invention resides in the provision of an instrument of the above character which further includes means for conveniently selecting a reciprocal bearing for use in executing procedure turns and like maneuvers. Also, actuated by the reciprocal bearing selector means are further means which insures proper sensing of the signals controlling the instrument when the aircraft is on or approaching the reciprocal course.

Another object of the instrument of the present invention is to provide to the pilot in a single instrument information which has heretofore been obtained only from a plurality of separate instruments.

For example, with the instrument of the present invention the requirement for a separate omni-bearing selector instrument on the aircraft instrument panel is eliminated and also the necessity for a separate deviation indicator is eliminated since both of these functions are included in the instrument of the present invention.

Other objects and advantages of the present invention not at this time particularly enumerated will become apparent as a description of the preferred embodiments of the present invention proceeds, especially when considered with respect to the accompanying drawings, wherein:

Fig. 9 is a schematic view of an instrument constructed in accordance with another embodiment of the present invention.

Referring now to the embodiment of the invention illustrated in Figs. 1 through 8, inclusive, reference character 1 designates the instrument housing having a front wall or bezel 2 with an opening 3 therein through which the various indicating elements may be viewed. The opening 3 may be provided with a suitable cover or bezel glass 4 for protecting the interior of the instrument from dust, dirt, moisture, etc. Situated preferably at the center of opening 3 is an aircraft reference index 5 which in this embodiment may be engraved or otherwise delineated on the inner surface of the bezel glass or rigidly supported on a suitable, preferably inconspicuous post as desired, which reference index in the embodiments illustrated represents by its shape the direction of travel of the aircraft with respect to a predetermined radio beam although this index need not have a directional character, it being assumed that the aircraft is heading in a direction corresponding to the top of the instrument face. In this embodiment of the present invention the aircraft reference index is a plan representation of a typical or conventional aircraft having a fuselage and laterally extending wings and horizontal stabilizer. Furthermore, in this embodiment of the present invention the aircraft index is fixed relative to the instrument housing and hence relative to the aircraft and is so positioned on the glass that the fuselage of the representative aircraft is vertical, with the intersection of the wings and the fuselage at the center of the opening.

Viewable through the instrument opening 3 and cooperable with aircraft reference index 5 is an indicating member or pointer 6 which simulates by its shape the direction of propagation of a navigational radio beam. As shown, this indicating member or pointer 6 is constructed in the form of a wedge or an elongated, narrow V. In accordance with an object of the present invention the wedge shaped or V-shaped pointer 6 represents to the pilot a strikingly familiar radio beam pattern which clearly designates the direction of propagation thereof from the transmitter or range station, i. e., the typical and familiar beam representation used on aircraft charts and maps. Although the radio waves travel from a station in a direction away from the transmitting antenna, it will be understood that the pointer 6 designates by its shape the direction of the beam towards the station. For example, if the bearing of a course defined by a radio beam towards a particular station is, say 60°, the direction of propagation of the beam is consired to be 60° for the purposes of the present invention although, of course, the radio waves actually travel in the opposite direction.

Figure 1:
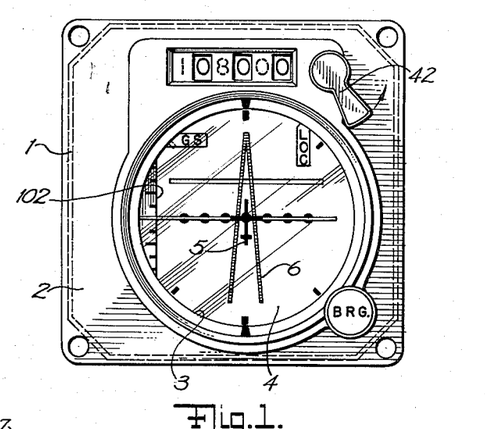
Fig. 1 is a front elevation view of the instrument as seen by the pilot.

Pointer 6 is adapted to be rotated, preferably about the center of the opening 3 as an axis, to an angle equal to the difference between the selected magnetic bearing, i. e., the bearing of the radio course to be flown, and the magnetic heading of the aircraft. Furthermore, the pointer 6 is adapted to be displaced in directions substantially radially from said axis and hence radially from said aircraft reference index 5 as a function of the magnitude and sense of the displacement of the aircraft from the radio-defined course. When the aircraft heading corresponds to the bearing of the radio beam and is on the beam, the instrument will appear as illustrated in Fig. 1. With the instrument of the present invention the pilot is informed as to his position and direction of travel relative to a selected radio-defined course. A detailed description of the operation of the instrument of the present invention will be hereinafter more fully described with respect to a typical point-to-point flight.

Figure 2:
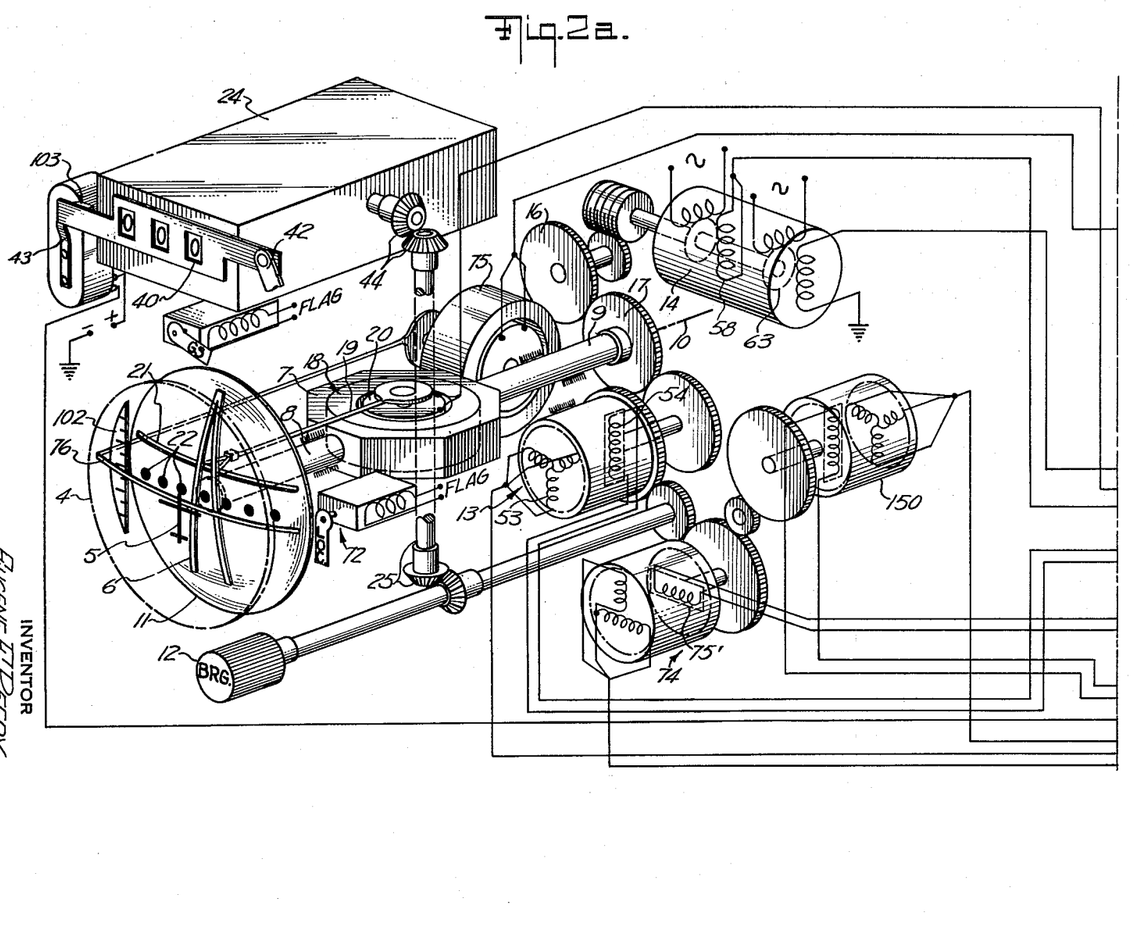
Figs. 2A and 2B together form a schematic illustration of a preferred embodiment of the indicator of the present invention and the apparatus associated therewith for controlling the indicating elements thereof.

V-shaped pointer 6 is supported in the instrument housing 1 by means of a gimbal-like arrangement illustrated schematically in Fig. 2 which comprises a gimbal frame 7 pivotally supported in suitable bearings by shafts 8 and 9 extending parallel to and coincident with an axis 10 and preferably aligned with the center of the opening 3. Secured to the end of shaft 8 is a background member 11 for the pointer 6 which may be in the form of a truncated sphere having a radius substantially equal to the radius of pivotal movement of the pointer actuating arm (to be described) and of such size that the peripheral edge thereof extends in all directions beyond the edge of opening 3. Gimbal frame 7 and hence background member 11 is stabilized in space about axis 10 in a manner to maintain the pointer 6 directed in a direction parallel to the magnetic bearing of a selected radio beam regardless of changes in heading of the aircraft by means of a suitable magnetic reference such as, for example, by a slaved gyro-magnetic compass 50 (Fig. 2B), a bearing selector knob 12, differential synchro 13, and servomotor 14 energized from a suitable heading servo amplifier 15 in a manner to be described, the servomotor driving gimbal 7 through suitable gearing 16 and 17.

V-shaped pointer 6 is displaced laterally of said aircraft reference by suitable motive means such as, for example, a meter movement 18 the rotor 20 of which is pivotally supported in gimbal frame 7 for limited rotation about an axis at right angles to the axis of rotation of gimbal frame 7. Pointer 6 is operatively connected with meter movement 18 by means of an arm 19 which extends from the rotor 20 of the meter movement 18 through a suitable slot 21 in spherical background 11. The magnitude of displacement of the aircraft from the selected radio beam is indicated to the pilot by suitable calibrations in the form of a series of dots 22 extending parallel to the slot 21. Meter movement 18 is excited with right-left radio displacement signals from a suitable radio receiving apparatus 23 (Fig. 2B) in the aircraft which may be an omni-range receiver of the type disclosed in U. S. Patent No. 2,616,076, issued on October 28, 1952 to Lyman et al. and assigned to the same assignee as the present invention. A further description of the radio receiving apparatus with which the instrument of the present invention may be conveniently employed may be found in Technical Development Report No. 113 issued in June 1950 by the Civil Aeronautics Administration, entitled "The CAA VHF Omnirange." As explained in this report, a VHF omni-range receiver operates on I. L. S. localizer beams as well as on conventional two-course and omni-range facilities.

The magnetic bearing of the selected radio beam or radio course may be indicated to the pilot by means of a drum-type counter, for example, located preferably at the top of the instrument housing as illustrated in Fig. 1 and as schematically illustrated at 24 in Fig. 2A. The counter 24 is driven by bearing selector knob 12 through suitable shaft and gearing 25. The structural details of the bearing selector indicator or counter are illustrated in Figs. 3 and 4.

Figure 3:
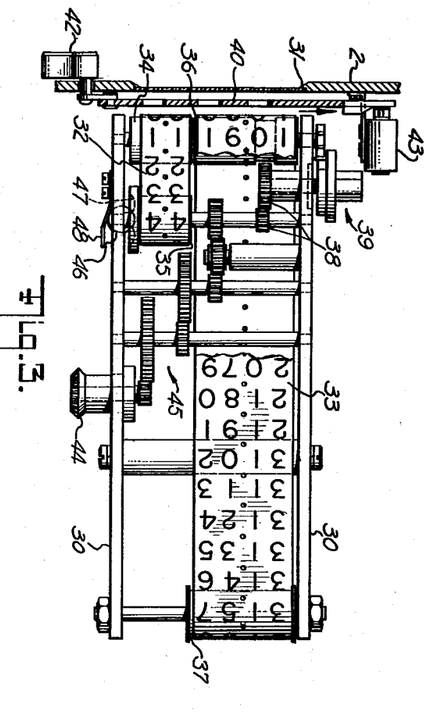
Fig. 3 is a top elevation view of the bearing selector counter illustrated schematically in Fig. 1.
Figure 3A:
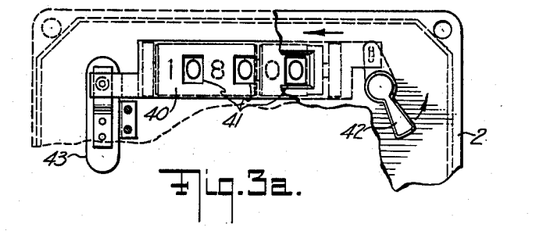
Fig. 3A is a front view of the bearing selector counter illustrated in Fig. 3.

As shown in Fig. 3 the bearing selector counter 24 comprises a pair of side plates 30 supported in instrument housing 1 by suitable brackets (not shown) and so positioned therein that the front of the counter lies adjacent an opening 31 in the bezel 2. Two endless counter tapes 32 and 33 are supported between plates 30 on rollers or sprockets 34, 35 and 36, 37, respectively, which in turn are journalled in side plates 30. In Fig. 4 there is shown a development of each of the tapes 32 and 33. Tape 32 has two identical columns or rows of digits progressing from one to zero and designating unit degrees of magnetic bearing. Suitable sprocket holes are provided to engage corresponding sprocket pins when the tape 32 is wrapped around or reaved on sprockets 34 and 35 to thereby provide a positive drive between sprocket and tape. The diameters of the sprockets 34 and 35 are so selected that for each two revolutions thereof the tape 32 will make one complete traverse, that is, will successively present at opening 31 all of the numerals 1 to 0.

Figure 4:
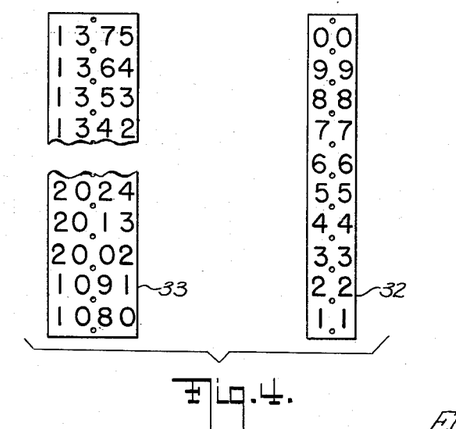
Fig. 4 shows a development of the two numeral tapes of the bearing selector counter.

As shown in Fig. 4, the endless tape 33 has four columns of digits thereon, alternate columns having numerals progressing respectively from 00 to 35 and designating hundreds and tens degrees of magnetic bearing but so relatively arranged that any two adjacent alternate numerals presented at opening 31 are 180° apart. Like tape 32, tape 33 is provided with suitable sprocket holes which are adapted to engage pins on drive sprocket 36 which provides a positive drive for tape 33. In order to advance tape 33 one digit space for every complete traverse of the digits on tape 32 a one-tenth-to-one gear transmission must be employed therebetween. This is provided by means of a 2:1 gearing 38 and a one-fifth-to-one Geneva mechanism 39. Drum 35 is driven from bearing selector knob 12 by means of bevel gearing 44 and suitable step-down gearing 45. Furthermore, in order to provide a positive positioning of the numerals on tapes 32 and 33 in the opening 31 a detent is employed which comprises a ball 46 guided in side plate 30 and forced into conical detents 47 in sprocket 35 by a pressure of leaf spring 48. The affect of the detent device is felt by the pilot through the drive gear train 45, 55, and 25 on bearing selector knob 12 so that in selecting the bearing of the radio course there will be no ambiguity in the position of the numerals within the opening 31.

As will become apparent as a description of the instrument proceeds, it is desired that the pilot may conveniently select the reciprocal bearing of the selected radio course bearing. For this purpose and as illustrated in more detail in Fig. 3A, a positionable shutter or mask 40 is provided behind bezel opening 31 which is provided with three rectangular cutouts 41 so spaced as to present in one position thereof alternate numerals on tape 33 and one of the numerals on tape 32 and in the other position thereof to present the other alternate set of numerals on tape 33 and the other numeral on tape 32. The shutter 40 is positioned by means of a shutter-operating knob or handle 42. As will be described, actuation of knob 42 to translate shutter 40 from one position to another will also actuate a suitable microswitch 43 which controls, through a suitable reversing relay, the sense of operation of the stabilizing servo system for the V-shaped pointer 6 and the pointer displacing meter movement 18.

Referring again to Figs. 2A and 2B, the gimbal 7 is stabilized about axis 10 in a manner to maintain the pointer 6 directed in a direction parallel to the magnetic bearing of a selected radio beam regardless of changes of heading of the aircraft by means of the positional servo loop between it and slaved gyromagnetic compass 50. In other words, the servo loop operates to position the gimbal 7 and hence pointer 6 relative to the aircraft reference index in accordance with the angular difference between the bearing of the selected course and the heading of the aircraft relative to magnetic north. As shown, slaved gyromagnetic compass 50 provides a signal at synchro transmitter 51 corresponding to the heading of the aircraft relative to magnetic north as established by a suitable magnetic reference such as flux valve 52, which signal appears on the rotatably mounted stator windings 53 of synchro 13. Stator or field windings 53 of differential synchro 13 are rotated to a position corresponding to the magnetic bearing of the selected radio course, by means of bearing selector knob 12, thus rotating the magnetic heading vector generated in synchro 13 by synchro 51, to an angle corresponding to the angular difference between the bearing of the selected course and the heading of the craft relative to magnetic north. If the gimbal 7 is at a position other than that corresponding to the direction of this resulting electrical vector, an error signal will be generated in rotor winding 54, directly coupled with gimbal 7 by means of gear 17, which error signal is applied through reciprocal bearing relay 56 and To-From relay 57, to the heading servo amplifier 15. The output of amplifier 15 is supplied to control winding 58 of heading servomotor 14 to thereby rotate gimbal 7 and hence rotor winding 54 in a direction and to an amount such as to zero this positional error. In the illustrated embodiment of the present invention, synchro 13 comprises a conventional control transformer, the stator of which is rotatably mounted in the instrument housing so that in effect this synchro functions as a differential synchro.

Figure 6:
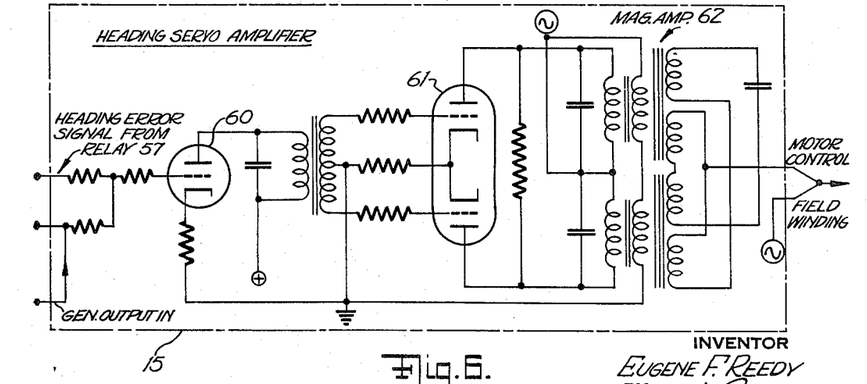
Fig. 6 is a wiring diagram of the heading servo amplifier also illustrated schematically in Fig. 2.

Heading servo amplifier 15 is illustrated in more detail in Fig. 6. As shown, this servo amplifier is an A. C. amplifier receiving the heading error signal from relay 57 and applying the same to a pre-amplifier stage 60. This amplified A. C. signal is demodulated at demodulator stage 61, the D. C. output thereof being supplied to a D. C. input-A. C. output magnetic power amplifier 62, the output of which is connected to control winding 58 of heading servomotor 14. In order to stabilize the heading servo loop, a rate generator 63 is employed which feeds back a damping signal degeneratively to the input of heading servo amplifier 15 in a conventional manner.

Thus, in the above construction gimbal 7 functions to maintain V-shaped pointer 6 positioned about axis 10 to the bearing of the selected radio course regardless of the heading of the aircraft, that is, it is positioned relative to aircraft index 5 in accordance with the difference between the bearing of the course and the heading of the aircraft relative to magnetic north.

A beam coupler synchro 150 is also coupled with the bearing selector knob 12 and positioned thereby for the purpose of supplying a signal to the approach coupler 151 of an automatic pilot 152 which is proportional to deviations in craft heading from the bearing of the course set in through bearing selector knob 12. For this purpose, the stator of synchro 150 may be energized from the heading synchro 51 or may be coupled with another heading synchro of another compass system if desired, or with an equivalent synchro in the approach coupler 151. The output winding of synchro 150 supplied to beam coupler 151 will be a voltage corresponding to the heading of the aircraft relative to the selected course.

In the description of the instrument of the present invention reference will be made specifically to a VHF omni-range type radio receiver operable also with the two-course radio range as well as with an instrument landing localizer beam although it will be understood that any other type of receiver may be employed which provides deviation signals from a selected radio course. As is well known, a VHF omni-range radio navigation system enables a pilot to select any radial radio course toward or away from the range transmitter station. As set forth in the above-identified Lyman et al. patent, the transmitter station transmits a radio pattern comprising a variable phase signal varying in accordance with azimuth angles referenced to magnetic north and a fixed reference phase signal, and the mobile station includes a receiver for comparing the phase of the modulation produced by the variable phase signal and that of the reference phase signal to thereby determine the azimuth of the mobile station. Receiver 23 at the mobile station is illustrated schematically in Fig. 2B and comprises a receiver section 66 including R. F. detectors, etc. whose output is supplied to reference phase circuit 67 which includes suitable filters, demodulators, etc., and which supplies an audio frequency output component corresponding to the reference phase. This output signal is supplied after suitable filtering to a phase splitter network 68 and hence to phase shifting network which in the present embodiment comprises resolver 74. The phase shifted reference phase signal is returned to amplifier 23 and applied to phase comparison network or phase detector 70. The output of receiver 66 is also supplied to direction phase circuit 69 which also includes suitable filters, etc. for providing a variable directional phase signal, the output of which is supplied to phase comparison network 70. This phase comparison network 70 may be of any well known type which supplies a D. C. output proportional to the phase difference between two alternating current voltages. The output of phase detector 70 is proportional to the magnitude and sense of the displacement of the mobile station, i. e., the aircraft, from the course selected by selector 12, operating through phase shifter 74. Also, the output of phase shifter 74 and the output of direction phase circuit 69 are supplied to auxiliary circuits including flag circuit 71 and To-From circuit 73. The former circuit supplies a D. C. output signal to LOC warning flag actuating device 72 in the instrument housing 1. The warning flag will normally be out of view when the receiver is operating properly but if there is any malfunction in the receiving circuits or if the received signal is not of sufficient strength for proper operation of the receiver, the warning flag will become visible and inform the pilot not to rely on the instrument at that particular time. The latter, or To-From circuit 73 is provided for supplying a D. C. output having a polarity depending upon the direction of travel of the aircraft relative to the station, i. e., whether the aircraft is in a To area or a From area, as will be decribed.

Since a particular transmitter station is identified by a particular R. F. carrier frequency, a frequency selector switch 74' is provided for the receiver which tunes the receiver section 66 to the frequency of the selected station. Furthermore, receiver 23 is of the type which is adapted to operate with a localizer transmitter of an instrument landing system and to supply an output proportional to the magnitude and sense of deviation of the aircraft from the localizer beam. In accordance with an important feature of the present invention, when a localizer frequency is selected by operation of the frequency selector switch 74' means are provided to energize the glide slope pointer actuating means, such as meter movement 75, for controlling the glide slope pointer 76 in accordance with deviations from the glide slope beam of the I. L. S. as determined by the output of glide slope receiver 79. The magnitude of the glide slope displacement may be indicated by a suitable scale 102 as illustrated in Fig. 1. As is well known to those skilled in this art, it is customary to render the glide slope receiver 79 operative upon selection of a localizer frequency at the omni-range receiver. At this point it should be understood that although the glide slope pointer 76 is shown as a relatively long bar extending substantially across the face of the instrument opening 3 and readable relative to aircraft reference 5, it may be desirable to extend the bar only to a point adjacent the tip of the wing of the representative aircraft forming aircraft reference 5. Alternately, of course, the glide slope pointer bar 76 may be shortened to an extent such that it projects only a short distance from the right hand edge of glide slope displacement scale 102, if desired.

Also, upon selection of a localizer frequency means are actuated to render a To-From amplifier 77 inoperative as will be further described in relation to the operation of the present instrument. However, when a VOR frequency is selected through selector switch 74' means are actuated for stowing glide slope pointer out of view of the pilot and for rendering To-From relay amplifier 77 operative. Alternatively, however, it is to be understood that if desired, instead of stowing the glide slope pointer out of view of the pilot, altitude error signals may be applied to the pointer 76 to indicate departures of the aircraft from a selected altitude when flying a VOR range.

Figure 2B:
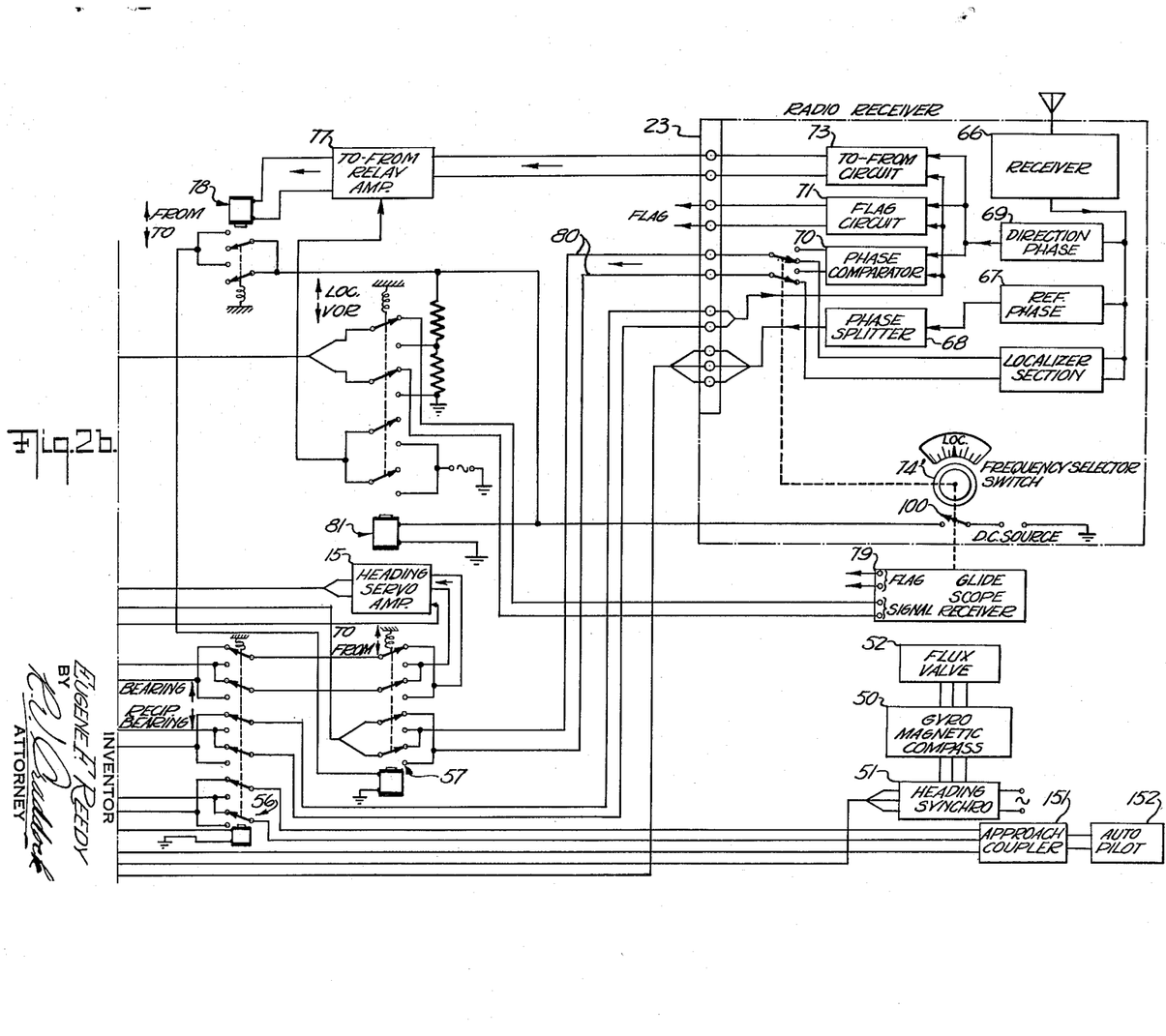

Still referring to Figs. 2A and 2B, the pilot, as above stated, in selecting the bearing of a desired course towards the station by means of bearing selector knob 12 and counter 24, rotates knob 12 thereby rotating the rotor 75' of resolver 74 which operates as a phase shifter network. Resolver 74 shifts the phase of the reference wave supplied by circuit 67 in an amount corresponding to the bearing of the course along which it is desired to proceed. Its output is supplied through reciprocal bearing relay 56 to phase comparator 70 where the phase shifted reference phase signal is compared with the direction phase signal. As above described, if there is a difference in phase between these two signals, a D. C. output will be supplied on leads 80 through To-From relay 57 to rotor 20 of meter movement 18 to thereby displace pointer 6 radially of index 5 in accordance with the phase difference between the direction phase and the reference phase, i. e., in accordance with the displacement or deviation of the aircraft from the course selected.

For a better understanding of the operation of the embodiment of the present invention illustrated in Figs. 1 through 6, a hypothetical flight from Airport X to Airport Y over way-points or check points defined by VOR transmitter stations R and S will be described, reference being made to Fig. 7 which illustrates a plan picture or ground track of such a flight. Also, in Fig. 7 the appearance of the instrument is illustrated at various aircraft positions A—K during this hypothetical flight as viewed by a pilot within the aircraft at the various positions. At the start of the flight from the runway at Airport X, i. e., at point A, the pilot tunes receiver 23 to the localizer frequency of the field's I. L. S. Since a localizer frequency is selected at frequency selector switch 74', switch 100 is opened thereby deenergizing VOR-LOC relay 81. A spring urges the contact arms of relay 81 to the LOC position thereby rendering To-From relay amplifier 77 inoperative by removing the amplifier plate supply (Fig. 5) so that To-From sensitive relay 78 moves to the To position under the influence of a suitable biasing spring. Likewise, To-From relay 57 is also deenergized and is spring biased to its To position thereby insuring proper sensing of V-pointer 6 relative to aircraft reference 5 in response to localizer signals from receiver 23. It should be noted that sensitive relay 78 may be eliminated and the output of amplifier 77 may be applied directly to the energizing coil of To-From relay 57.

After the localizer frequency has been selected, the pilot selects the inbound runway heading of airport 1, which in the flight under consideration is 85°, by rotating bearing selector knob 12 until the inbound runway heading 85° appears in the window 31. Since the aircraft is aligned with the runway heading of 85° and the bearing of 85° is selected, the difference between the bearing of the course and the heading of the craft relative to magnetic north is zero and the instrument will appear as at point A. During this hypothetical flight the shutter control handle 42 will be set to its full clockwise position so that the openings 41 uncover the right hand set of numerals in the bearing selector counter 24 and the reciprocal bearing switch 43 will be opened causing bearing reciprocal relay 56 to be spring biased to its up or bearing position as illustrated in Fig. 2B. In this position relay 56 insures proper sensing of the signal from bearing selector differential synchro 13 to heading servomotor 14 and the signal from resolver 74 to receiver 23 for the particular bearing selected. As bearing selector knob 12 is rotated, the direction of the electrical field in stator 53 which corresponds to the direction of the electrical field of the stator windings in compass synchro 51 is also rotated a corresponding amount to thereby generate an error signal in rotor 54 of synchro 13, if the angular position of gimbal 7 is different from the angle of the electrical field in stator 53. This error signal is supplied to servo amplifier 15 and motor 14 to thereby rotate gimbal 7 and hence the angular position of V-shaped pointer 6 to reduce this error signal to zero. Since as above stated the aircraft heading along the runway may be considered to be 85° and the bearing of the selected course is also 85°, the V-shaped pointer 6 will lie in a vertical position in the opening 3 of the instrument bezel 2. Furthermore, since the aircraft is on the runway, the localizer displacement signal will be zero and the V-shaped pointer 6 will be centered relative to aircraft index 5 and the instrument will appear as illustrated at point A.

After taking off and flying a predetermined distance along the localizer back course, the pilot selects the frequency of his first way point, VOR station R. In selecting this VOR frequency, switch 100 is closed thereby supplying a D. C. voltage to VOR—LOC relay 81 moving its contacts to the VOR position (in Fig. 2B, the down position). With relay 81 contacts in this position the same D. C. voltage is supplied to glide slope pointer meter movement 75 to cause the glide slope pointer 76 to be stowed out of view of the pilot. Of course, as stated above, instead of stowing glide slope pointer 76, the D. C. stowing signal can be replaced with a signal proportional to deviations from a selected altitude. At the same time an energizing voltage is supplied from To-From relay amplifier 77 (see Fig. 5) rendering To-From sensitive relay 78 responsive to To-From signals from receiver 23.

At point B, the pilot also selects the bearing of the course he desires to follow toward VOR station R which in this hypothetical flight is 330°. In selecting this bearing the pilot rotates bearing selector knob 12 until the bearing of 330° is visible in opening 31. At the same time the stator 53 of differential synchro 13 is rotated a like amount thereby rotating the pointer 6 through heading servomotor 14 to a position such that the axis of the V parallels the selected bearing of 330° in a manner set forth above. Assuming that the aircraft is at position B in Fig. 7 where the above sequence of operations takes place, a radio displacement signal will be received from receiver 23 which will deflect V-shaped pointer 6 radially to the right of reference 5 indicating that the aircraft is to the left of the selected beam, the instrument at this time appearing as illustrated adjacent point B in Fig. 7. It will be noted that the appearance of the indicator at this point would appear as though the pilot were consulting a radio navigation chart. That is, the V-shaped pointer 6 represents by its shape the direction of propagation of radio waves from VOR transmitter R, i. e., that he is in a To area relative to the station R, and the angular position and radial displacement of pointer 6 relative to the aircraft reference index 5 clearly informs the pilot of the position and heading of the aircraft relative to the beam.

Figures 7, 8:
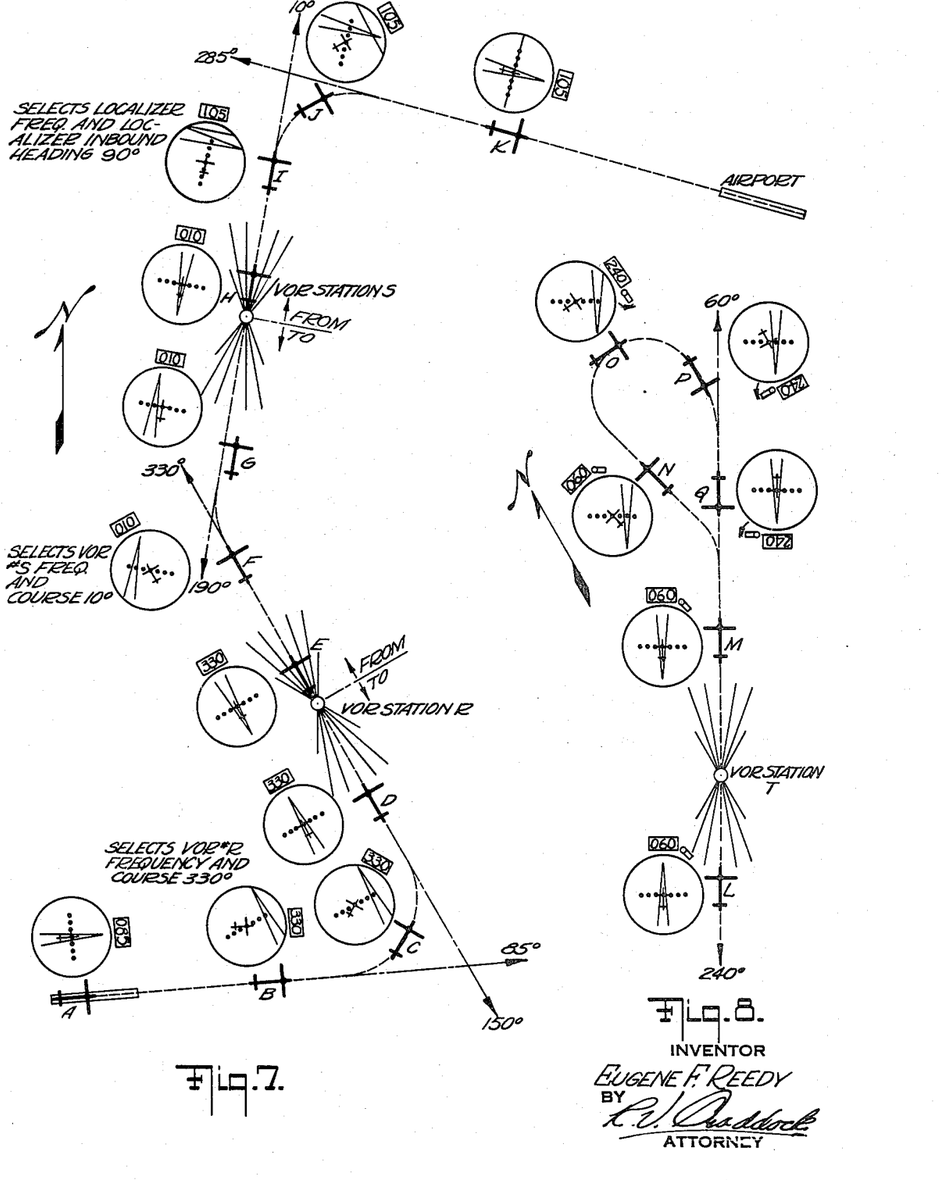
Fig. 7 is a flight path diagram useful in illustrating the operation of the instrument of the present invention.
Fig. 8 is a flight path diagram similar to Fig. 7 and useful in illustrating the operation of the instrument of the present invention during a standard procedure turn.

At point C in Fig. 7 the aircraft is illustrated as approaching the radio course defined by VOR transmitter R. If desired, an asymptotic approach to the radio-defined course may conveniently be executed with the instrument of the present invention by so controlling the aircraft heading that the apex of the V-shaped pointer 6 is maintained at the top center of the opening 3 in the face of the instrument. For this purpose a suitable index at this point on the instrument face (Fig. 1) may be provided. At position D the aircraft has completed its approach and is maintaining the radio-defined course and this fact is clearly indicated to the pilot by the indicator of the present invention.

As the aircraft passes over VOR transmitter R the displacement signal from radio receiver 23 reverses due to the 180° reversal of the direction phase and the reference phase of the transmitted radio waves. This reversal in the sense of the radio signal is detected in the To-From circuit 73, the output of which is applied to the non-operative amplifier 77. The output of amplifier 77 is supplied to relay winding of To-From sensitive relay 78 thereby supplying the D. C. potential from frequency selector switch 74' to To-From relay 57. As stated above, sensitive relay 78 may be eliminated and the output of amplifier 77 may be applied directly to relay 57.

At this point it should be stated that the gain of the To-From relay amplifier is so selected as to keep the "zone of uncertainty" down to a predetermined minimum. As is well known, this zone is that area at right angles to a selected course in which it is not certain whether the aircraft is flying in the To or From sector of the selected course. By proper selection of the gain of the To-From amplifier 77, To-From sensitive relay 78 is adjusted to remain in the To position until a definite From Signal is received.

In accordance with a feature of the present invention, energization of the To-From relay 57 will cause the output signal from bearing selector differential synchro 13 to be reversed thereby rapidly rotating V-shaped pointer 6 180° and at the same time reversing the sense of the radio displacement signal from receiver 23. Thus, as the aircraft passes over the station as at point E this fact will be conspicuously indicated to the pilot and inform him that he is now proceeding outbound therefrom. Furthermore, the V-shaped pointer 6 will continue to indicate in the proper sense the direction and magnitude of displacement of the craft from the outbound course. With this arrangement, the V-shaped pointer 6 continues to indicate to the pilot his direction of travel relative to VOR station 1.

At point F along the outbound course from VOR station R, the pilot selects the frequency of his second way point, i. e., VOR station S and also selects the course along which he desires to approach station S. Since again a VOR frequency has been selected, relay 81 will remain in its energized position. However, upon selection of VOR station S a To signal will be supplied from To-From circuit 73 in receiver 23 thereby causing To-From sensitive relay 78 to revert to its To position and hence deenergize To-From relay 57. Again, the output of heading selector differential synchro 13 will be reversed and pointer 6 will be rotated 180°. In selecting the bearing of the desired course toward VOR transmitter S, the pilot rotates bearing selector knob 12 until the desired course, which, in this hypothetical flight is 10°, appears in the counterwindow 31. As above, V-shaped pointer 6 will be positioned in the manner described above such that it is maintained directed in a direction parallel to the bearing of the desired radio beam or course by the gimbal-positioning servo loop.

At point G during the flight the aircraft is displaced to the right of the beam and the indicator appears as illustrated at this point in Fig. 7 which indicates to the pilot to turn the aircraft to the left in order to again return to the center of the beam.

At point H the aircraft has passed over the station S and the same sequence of operation of To-From sensitive relay 78 and To-From relay 57 takes place thereby reversing the V-shaped pointer 6 and the sense of the radio displacement signal to indicate to the pilot that he is flying outbound from station S.

Figure 5:
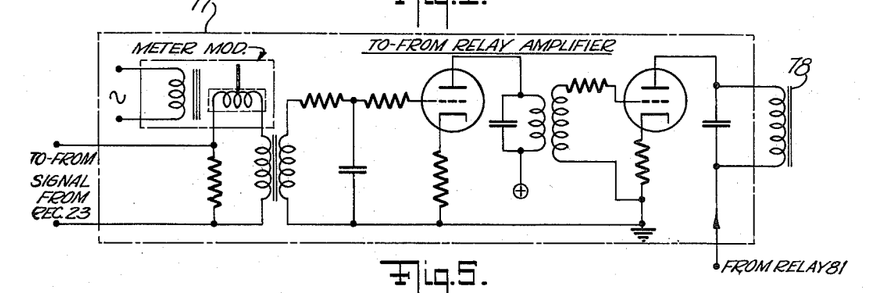
Fig. 5 is a wiring diagram of the To-From relay amplifier illustrated schematically in Fig. 2.

The aircraft is now approaching its destination, Airport Y, and at position I in Fig. 7 the pilot selects the localizer frequency of that airport and at the same time selects the inbound runway heading which, in this hypothetical flight, is 105°. Since the pilot selected a localizer frequency on frequency selector switch 74', switch 100 is opened thereby deenergizing localizer VOR relay 81. Upon deenergization of relay 81 the stowing voltage is removed from glide slope pointer 76 and is replaced by a voltage proportional to the displacement of the aircraft from the glide slope radio beam of the airport's I. L. S. At the same time, To-From relay amplifier is rendered inoperative by removing its plate supply as illustrated in Fig. 5, thus causing To-From sensitive relay 78 to revert to its To position which deenergizes To-From relay 57 and reverses the sensing of V-shaped pointer 6 in response to the output of receiver 23. Also, the output of differential synchro 13 will be reversed as described above. In selecting the bearing of the localizer radio course, bearing selector knob 12 is rotated so that the bearing of the localizer beam is visible at the counterwindow and pointer 6 is thus caused to maintain its direction parallel to the bearing of the localizer beam through the operation of differential synchro 13 and its associated servo loop. Thus, at point I the indicator tells the pilot that he is displaced from the localizer beam and that he is approaching it from the right. As the approach continues as shown at point J, the glide slope signal from glide slope receiver 79 displaces glide slope pointer 76 in accordance with the displacement of the aircraft from the glide slope beam. It will be noted that the magnitude of the displacement of the aircraft from the glide slope beam may be indicated by a suitable scale 102. At point K in Fig. 7 the indicator informs the pilot that he is on the localizer and glide slope beams and that he is making a proper approach to the runway of his destination, Airport Y.

From the above it will be observed that the instrument of the present invention at all times provides the pilot with an indication not only of the displacement and heading of the aircraft relative to the selected radio course, but also, and by the same indicating element or member, whether or not the aircraft is proceeding toward or way from the selected radio range station. Furthermore, it will be noted that at any point during a radio navigation procedure, the pilot will be immediately and conspicuously informed that he has passed over the station by a reversal of the V-shaped pointer 6 while at the same time maintaining correct beam displacement sensing.

The operation of the instrument of the present invention during a procedure turn may be clearly understood from a consideration of Fig. 8. Assuming the aircraft is at point L in Fig. 8 and is proceeding on course toward a selected station such as VOR station T and is on the selected radio course bearing of 60°, the indicator will appear as illustrated adjacent point L. As the aircraft passes over the station, To-From sensitive relay 78 will cause energization of To-From relay 57 to thereby reverse the heading servo signal and cause V-shaped pointer 6 to be rotated 180°, indicating, as at M, that the aircraft is proceeding outbound from station T. At some time during the outbound flight, the pilot initiates a procedure turn by turning, say to the left 45° as indicated by the alignment of suitable 45° calibrations on element 11 with the index at the top of the instrument in Fig. 1.

At this time it should be pointed out that if desired additional calibrations at the top and bottom of member 11 may be provided intermediate of the 45° calibrations indicated in Fig. 1 for the purpose of facilitating interpretation of the instrument under cross wind conditions. Furthermore, such intermediate calibrations, which may be located at say 10°, 20°, 30° and 40° from the central index on the top and bottom of member 11, will provide a convenient reference for making turns other than 45° away from the selected heading.

At point N the instrument will clearly indicate that the aircraft is still proceeding generally away from the station T, that is, in a From area, but at an angle of 45° to his original course of 60°. At point O, for example, halfway through his 180° turn back towards the radio course, the pilot may rotate reciprocal bearing handle 42 to its full counter-clockwise position. As illustrated more clearly in Fig. 2A and Fig. 3A, the shutter 40 will thus be moved to the left thereby covering the numerals representing his original bearing of 60° and uncovering or exposing the numerals representing his reciprocal heading of 240°. At the same time, microswitch 43 is closed by means of a suitable cam 103 on shutter 40 to thereby energize reciprocal bearing relay 56, which up to this point has been in its up position. Upon energization of relay 56 the signal from differential synchro 13 will be reversed which normally would cause a reversal of the V-shaped pointer 6. However, at the same time, relay 56 also reverses the output of phase shifter resolver 74 thereby reversing the input to phase comparator 70 of receiver 23 which will result in a To signal being supplied to To-From relay amplifier 77 to thereby cause To-From sensitive relay 78 and To-From relay 57 to be actuated to the To position. Due to this switching action, the output of differential synchro 13 will again be reversed so that in effect V-shaped pointer 6 will remain at the same position that it had at the time the reciprocal bearing handle was actuated. Further, due to the reversal of the radio displacement signal through actuated To-From relay 57, V-shaped pointer 6 will be displaced in its proper sense from the aircraft reference 5. Therefore, upon actuation of reciprocal bearing handle 42 the instrument will appear as illustrated at O in Fig. 8. At aircraft positions P and Q in Fig. 8 the V-shaped or wedge pointer 6 will clearly indicate to the pilot his position and direction of travel relative to the radio beam defined by VOR station T. Of course, it is to be understood that the reciprocal bearing handle can be actuated at the pilot's discretion at any time during the procedure turn, i. e., either before or after the turn is completed. Furthermore, the reciprocal bearing selector switch handle 42 need not be displaced from one position to another at which it remains, as illustrated in the present embodiment, but on the other hand, the switch handle 42 may operate shutter 40 and switch 43 through a spring and ratchet connection. In this case the shutter may be actuated successively in one direction and then in another by successive movements of handle 42 in a single direction, it being returned to its original position by means of a suitable spring.

In Fig. 9 there is illustrated schematically another embodiment of the present invention. In this embodiment the aircraft reference index 5 is angularly positioned in accordance with the magnetic heading of the craft and the V-shaped pointer 6 is rotatably positioned to the bearing of the selected radio beam or radio course. For this purpose, heading transmitter 51 of the gyromagnetic compass 50 is connected through receiver synchro 110 and its associated servo loop including servo amplifier 111 and motor-generator set 112 to position the aircraft reference index 5 in accordance with the magnetic heading of the aircraft. In other words, in this embodiment aircraft reference 5 is a heading repeater. Although in Fig. 9 any suitable mechanical connection may be provided between synchro 110, motor 112 and aircraft index 5 as schematically indicated by a dotted line connection 113, one such drive may be accomplished in the following manner. The aircraft reference 5 may be inscribed or otherwise delineated preferably on, and centrally of, the interior surface of the bezel glass 4 of Fig. 2A and the bezel glass may be provided with a peripheral gear, driven through a spur gear connection, directly, or through suitable gear reduction, from motor 112. It will be understood, however, that the instrument may be arranged such that aircraft reference 5 is positioned directly by heading repeater synchro 110 in which case the rotor would be excited from the A. C. line thus eliminating servo amplifier 111 and motor generator set 112.

In the embodiment illustrated in Fig. 9, the V-shaped pointer 6 and its associated mounting structure may be substantially identical to that illustrated in Fig. 2A. In this embodiment, gimbal 7, background member 11 attached thereto, and V-shaped pointer 6 are angularly positioned to the bearing of the selected course through differential synchro 114, servo amplifier 115 and servomotor and motor-generator set 116. The selected bearing may be indicated by counter 124 connected directly to the bearing selector knob as in Fig. 2A, but furthermore it may be desirable in this embodiment to provide a fixed annular compass card 117 which surrounds background member 11 and against which a reference pointer or bearing marker 118 fixed to member 11 may be set. V-shaped pointer 6 is displaced laterally of index 5 in accordance with the lateral displacement of the aircraft from the selected course as in Figs. 2A and 2B. Bearing selector knob 12 also positions the rotor of the beam coupler synchro 150 and bearing resolver synchro 74 as in Fig. 2A.

In the operation of the embodiment of Fig. 9, the pilot rotates bearing selector knob 12 until the bearing of the desired course appears on counter 24 and/or until the bearing marker 118 lies adjacent the corresponding calibration on compass card 117 at which position the bearing marker 118 will remain. Inasmuch as aircraft reference index 5, which by its shape indicates the direction of travel of the aircraft, is positioned in accordance with the heading of the aircraft, the bearing of the selected radio course relative to the heading of the aircraft will be clearly indicated to the pilot. This relative heading may also be indicated to the pilot in degrees by the angular position of the nose of miniature aircraft 5 relative to angular position of marker 118 on compass card 117. Assuming the aircraft is displaced to the right of the selected radio beam and is heading generally toward the station as determined by the output of To-From circuit 73 and To-From amplifier 77, the instrument will appear as indicated in Fig. 9. Now assume that the aircraft obtains the beam and passes over the selected radio station. At this time amplifier 77 driven from To-From circuit 73 will operate relay 78' which reverses the phase of the A. C. signal to servo amplifier 115 and motor-generator set 116 to thereby reverse the position of gimbal 7 and hence the position of V-shaped pointer 6, thus conspicuously indicating to the pilot that he has, in fact, passed over the station. Also, relay 78' will reverse the sense of operation of V-shaped pointer 6 which responds to displacement signals from the radio receiver. Gimbal 7 and hence background member 11 and V-shaped pointer 6 will continue to indicate that the aircraft is outbound from the selected station until the pilot selects another radio station as in the embodiment shown in Figs. 2A and 2B.

The operation of reciprocal bearing relay 56 as controlled by reciprocal bearing knob 42 and switch 43 is the same in the embodiment of Fig. 9 as in the embodiment illustrated in Figs. 1 to 8, inclusive, and in particular, with respect to the description of the operation of the instrument during a procedure turn illustrated in Fig. 8.

Figure 10:
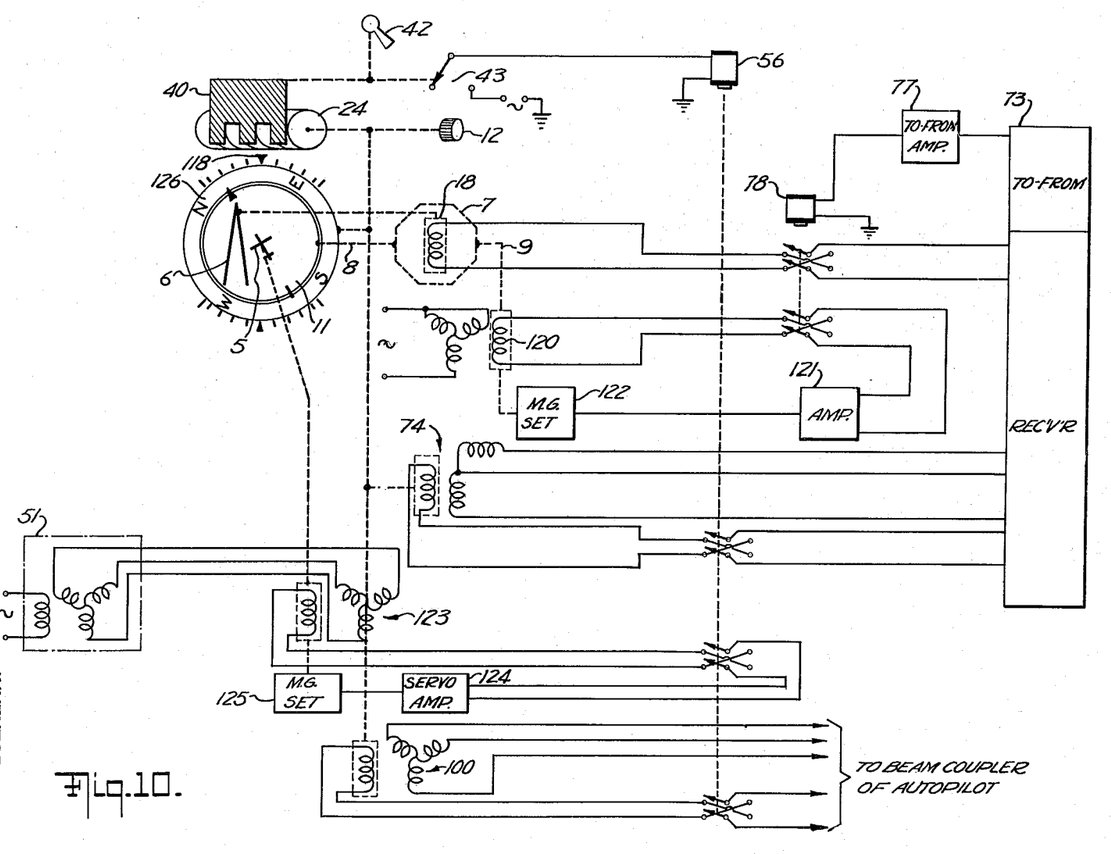
Fig. 10 is a schematic view similar to Fig. 9 illustrating a further embodiment of the present invention.

In Fig. 10 there is illustrated still a further embodiment of the present invention. In this embodiment the V-shaped pointer 6 is arranged always to move substantially horizontally across the face of the instrument as in the case of a conventional deviation indicator. For this purpose, gimbal 7, its associated background member 11 and V-shaped pointer 6 are positioned to the null of synchro 120 through servo amplifier 121 and motorgenerator set 122 which null is preferably arranged such that gimbal 7 lies in a substantially horizontal plane in the instrument. Thus, meter movement 18 which is excited as in Figs. 2 and 9 by the output of the radio receiver in accordance with the displacement of the aircraft from a selected radio course always moves V-shaped pointer 6 horizontally across the face of the instrument. In this embodiment, aircraft reference index 5 which, by its shape, indicates the direction of travel of the aircraft, is positioned in accordance with the difference between the magnetic heading of the aircraft and the bearing of the selected course by means of compass synchro 51, differential synhcro 123, and servo amplifier and servomotor 124 and 125. In the embodiment of Fig. 10, compass card 126 is rotatably mounted in the instrument and is positioned by bearing selector knob 12 relative to fixed index 118 thereby indicating the bearing of the selected radio course. Since bearing selector knob 12 also rotates the stator element of differential synchro 123, the aircraft reference index 5 indicates the heading of the aircraft relative to the bearing of the selected radio course, this heading being indicated by the angular position of the nose of aircraft index 5 relative to rotatable compass card 126.

The operation of the embodiment of Fig. 10 is generally similar to that of Figs. 2 and 9 except that, as set forth above, V-shaped pointer 6 always moves horizontally across the face of the instrument. However, as the aircraft passes over the station To-From circuit 73 and To-From amplifier 77 cause relay 78' to reverse the null of synchro 120 to thereby reverse V-shaped pointer 6 to clearly indicate to the pilot the direction of propagation of the radio waves from the selected station relative to the aircraft, that is, the general direction of travel of the aircraft relative to the station. Also, as in the other embodiments of this application, the polarity of the radio displacement signal supplied to repeater 18 is also reversed by To-From relay 78' thereby preserving proper sensing of the instrument when the aircraft passes over the station into the From area.

Again, the operation of the reciprocal bearing features of this embodiment is the same as described with relation to the embodiments illustrated in Figs. 2A, 2B, and Fig. 9.

While I have described my invention in its preferred embodiments it is to be undertsood that the words which I have used are words of description rather than of limitation and that changes within the purview of the appended claims may be made without departing from the true scope and spirit of my invention in its broader aspects.

What is claimed is:

1. A radio navigation display instrument for enabling a pilot to maneuver an aircraft so as to approach and thereafter maintain a selected course defined by a radio beam propagated from a selected station comprising an aircraft reference index adapted to indicate the direction of travel of said aircraft, a pointer simulating by its shape the direction of propagation of said radio beam, means responsive to deviations in the heading of said aircraft from the bearing of said selected course for producing relative rotation between said reference index and said pointer, and means controlled in accordance with the magnitude and sense of the displacement of said craft from said beam for producing relative radial displacement between said reference index and said pointer whereby said instrument indicates to the pilot not only the lateral position and the heading of said aircraft relative to said beam but also whether the aircraft is proceeding toward or away from said radio beam station.

2. A radio navigation display instrument for enabling a pilot to maneuver an aircraft so as to approach and thereafter maintain a selected course defined by a radio beam propagated from a selected station comprising an aircraft reference index located substantially at the center of said opening and representing by its shape the direction of travel of said aircraft, a pointer simulating by its shape the direction of propagation of said radio beam, means responsive to deviations in the heading of said aircraft from the bearing of said selected course for producing relative rotation between said reference index and said pointer, and means controlled in accordance with the magnitude and sense of the displacement of said craft from said beam for correspondingly displacing said pointer substantially radially of said reference index whereby said instrument indicates to the pilot not only the lateral position and the heading of said aircraft relative to said beam but also whether the aircraft is proceeding toward or away from said radio beam station.

3. A navigation instrument of the character set forth in claim 2 wherein the shape of said aircraft reference index resembles a plan view of a conventional aircraft having fuselage and laterally extending wings and stabilizers, and the shape of said pointer resembles an elongated, narrow V.

4. A navigation instrument for enabling a pilot to maneuver an aircraft so as to approach and thereafter maintain a selected course defined by a radio beam propagated from a selected station comprising an instrument housing having a viewing opening in a wall thereof, a fixed aircraft reference index located substantially at the center of said opening and adapted to indicate by its shape the direction of travel of said aircraft, a substantially wedge-shaped pointer simulating by its shape the direction of propagation of the radio beam, means responsive to deviations in the heading of said aircraft from the bearing of the selected course for rotating said pointer about said reference index as an axis, and means responsive to the magnitude and sense of displacement of said aircraft from said radio beam for additionally and correspondingly displacing said pointer substantially radial of said aircraft index whereby said instrument indicates to the pilot not only the lateral position and the heading of said aircraft relative to said beam but also whether the aircraft is approaching or departing from said radio beam station.

5. A navigation instrument for enabling a pilot to maneuver an aircraft so as to approach and thereafter maintain a selected course defined by a radio beam propagated from a selected station comprising an instrument housing having a viewing opening in a wall thereof, an annular compass card surrounding said viewing opening, an aircraft reference index adapted to indicate the direction of travel of said aircraft, said index being rotatably mounted in said housing for rotation about the center of said opening as an axis, compass means for rotating said reference index in accordance with the heading of said aircraft, a wedge-shaped pointer simulating by its shape the direction of propagation of said radio beam, means for relatively positioning said pointer and compass card about the center of said opening as an axis to thereby indicate the bearing of the radio beam relative to the heading of said aircraft, and means responsive to the magnitude and sense of the displacement of said aircraft from said radio beam for correspondingly displacing said wedge-shaped pointer substantially radially of said aircraft index whereby said instrument indicates to the pilot the lateral position and the heading of said aircraft relative to said beam and also whether said aircraft is approaching or departing from said radio beam station.

6. A navigation instrument for enabling a pilot to maneuver an aircraft so as to approach and thereafter maintain a selected course defined by a radio beam propagated from a selected station comprising an instrument housing having a viewing opening in a wall thereof, an annular compass card surrounding said opening, an aircraft reference index representing by its shape the direction of travel of said aircraft, said index being rotatably mounted in said housing for rotation about the center of said opening as an axis and positioned in accordance with the heading of said aircraft, a substantially wedge-shaped pointer simulating by its shape the direction of propagation of the radio beam, means including bearing selector means for adjusting the relative angular position between said pointer and said compass card to thereby indicate the bearing of said radio beam relative to the heading of said aircraft, and means responsive to the magnitude and sense of the displacement of said aircraft from said radio beam for correspondingly displacing said pointer substantially radially of said aircraft index whereby said instrument indicates to the pilot not only the lateral position and the heading of said aircraft relative to said beam but also whether said aircraft is proceeding toward or away from said radio beam station.

7. A navigation instrument for enabling a pilot to maneuver an aircraft so as to approach and thereafter maintain a selected course defined by a radio beam propagated from a selected station comprising an instrument housing having a viewing opening in a wall thereof, a fixed annular compass card surrounding said opening, an aircraft reference index representing by its shape the direction of travel of said aircraft, said index being rotatably mounted in said housing for rotation about the center of said opening as an axis and positioned in accordance with the heading of said aircraft, a substantially wedge-shaped pointer simulating by its shape the direction of propagation of the radio beam, a support member for said pointer having a bearing marker fixed thereto and adapted to lie adjacent said compass card, means including bearing selector means for positioning said bearing marker to a position on said compass card corresponding to the bearing of said radio beam, and means mounted on said support member and responsive to the magnitude and sense of the displacement of said aircraft from said radio beam for correspondingly displacing said pointer substantially radially of said aircraft index whereby said instrument indicates to the pilot not only the lateral position and the heading of said aircraft relative to said radio beam but also whether said aircraft is approaching or departing from said radio beam station.

8. A navigation instrument for enabling a pilot to maneuver an aircraft so as to approach and thereafter maintain a selected course defined by a radio beam propagated from a selected station comprising an instrument housing having a viewing opening in a wall thereof, a fixed radio beam bearing marker adjacent said viewing opening, an annular compass card surrounding said opening and mounted for rotation about the center thereof as an axis, means including bearing selector means for selectively positioning said compass card relative to said bearing marker to a position corresponding to the bearing of said radio beam, an aircraft reference index adapted to indicate the direction of travel of said aircraft relative to said beam and rotatably mounted in said housing for rotation about said axis, means for rotating said index in accordance with the difference between the heading of said aircraft and the bearing of said beam whereby to indicate the heading of said aircraft relative to the bearing of said beam, a substantially wedge-shaped pointer simulating by its shape the direction of propagation of the radio beam, and means responsive to the magnitude and sense of the displacement of said aircraft from said beam for correspondingly displacing said pointer substantially radially of said aircraft index whereby to indicate the lateral position of said aircraft relative to said radio beam and also whether said aircraft is approaching or departing from said radio beam station.

9. A navigation instrument for enabling a pilot to maneuver an aircraft so as to approach and thereafter maintain a selected course defined by a radio beam propagated from a selected station comprising an instrument housing having a viewing opening in a wall thereof, a fixed aircraft reference index located substantially at the center of said opening and representing by its shape the direction of travel of said aircraft, a substantially V-shaped pointer simulating by its shape the direction of propagation of the radio beam, a support member pivotally mounted in said instrument housing for supporting said pointer for rotation about said axis, means for stabilizing said support member in space to the bearing of the radio beam, and pointer actuating means mounted on said support member and controlled in accordance with the magnitude and sense of the displacement of said aircraft from said radio beam for displacing said pointer substantially laterally of said aircraft reference index whereby said instrument indicates to the pilot the lateral position and the heading of said aircraft relative to said beam and also whether said aircraft is approaching or departing from said radio beam station.

10. A navigation instrument for enabling a pilot to maneuver an aircraft so as to approach and thereafter maintain a selected course defined by a radio beam propagated from a selected station comprising an instrument housing having a viewing opening in a wall thereof, a fixed reference index located substantially at the center of said opening and representing by its shape the direction of travel of said aircraft, a substantially V-shaped pointer simulating by its shape the direction of propagation of the radio beam, a support member pivotally mounted in said instrument housing for supporting said pointer for rotation about said axis, bearing selector means for positioning said support member to the bearing of said radio beam and for thereafter stabilizing said support member at said selected bearing, pointer actuating means carried by said support member and controlled in accordance with the magnitude and sense of the displacement of said aircraft from said radio beam for correspondingly displacing said pointer substantially laterally of said aircraft reference index, whereby to indicate to the pilot not only the position and heading of said aircraft relative to said radio beam but also the direction of travel of said aircraft relative to said radio beam station.

11. A navigation instrument for enabling a pilot to maneuver an aircraft so as to approach and thereafter maintain a selected course defined by radio waves propagated from a selected station, said radio course being of a type in which a reversal of wave sense occurs upon passing of the aircraft over the station comprising an instrument housing having a viewing opening in a wall thereof, an aircraft reference index located substantially at the center of said opening, a pointer simulating by its shape the direction of propagation of said radio waves, means responsive to deviations in the heading of said aircraft from the bearing of said selected course for producing relative rotation between said reference index and said pointer about the center of said opening as an axis, means responsive to the magnitude and sense of the displacement of said aircraft from said radio beam for producing a corresponding radial displacement between said reference index and said pointer, and means responsive to a reversal in the sense of said radio waves for rotating said pointer substantially 180° upon passing of said aircraft over said station and for simultaneously reversing the sense of the relative displacement of said reference index and said pointer, whereby to indicate to the pilot not only the position and heading of said aircraft relative to said beam but also the direction of travel of said aircraft both during its approach toward and during its departure from said radio beam station.

12. A navigation instrument for enabling a pilot to maneuver an aircraft so as to approach and thereafter maintain a selected course defined by radio waves propagated from a selected station, said radio course being of a type in which a reversal of wave sense occurs upon passing of the aircraft over the station, comprising an instrument housing having a viewing opening in a wall thereof, an aircraft reference index located substantially at the center of said opening and representing by its shape the direction of travel of said aircraft, a pointer simulating by its shape the direction of propagation of said radio waves, means pivotally mounted in said instrument housing for supporting said pointer for rotation about the center of said opening as an axis, means mounted on said support means and responsive to the magnitude and sense of the displacement of said aircraft from said radio beam for correspondingly displacing said pointer substantially radially of said index, and means responsive to a reversal in the sense of said radio waves for rotating said support means substantially 180° upon passing of said aircraft over said station and for simultaneously reversing the sense of the displacement of said pointer, whereby to indicate to the pilot the position and direction of travel of said aircraft both during its approach toward and during its departure from said station.

13. A navigation instrument for enabling a pilot to maneuver an aircraft so as to approach and thereafter maintain a selected course defined by radio waves propagated from a selected station, said radio course being of a type in which a reversal of wave sense occurs upon passing of the aircraft over the station, comprising an instrument housing having a viewing opening in a wall thereof, an aircraft reference index located substantially at the center of said opening and representing by its shape the direction of travel of said aircraft, a pointer simulating by its shape the direction of propagation of said radio waves, means pivotally mounted in said instrument housing for supporting said pointer for rotation about the center of said opening as an axis, bearing selector means for positioning said support means to the bearing of said radio beam towards said station and for thereafter stabilizing said support means at said bearing, means mounted on said support means and responsive to the magnitude and sense of the displacement of said aircraft from said radio beam for correspondingly displacing said pointer substantially radially of said index, and means responsive to a reversal in the sense of said radio waves for rotating said support means substantially 180° upon passing of said aircraft over said station and for simultaneously reversing the sense of the displacement of said pointer, whereby to indicate to the pilot the position and heading of said craft relative to said beam and also the direction of travel of said aircraft both during its approach toward and during its departure from said station.

14. A navigation instrument for enabling a pilot to maneuver an aircraft so as to approach and thereafter maintain a selected course defined by radio waves propagated from a selected station, said radio course being of the type in which a reversal of wave sense occurs on passing of the aircraft over the station, comprising an instrument having a viewing opening in a wall thereof, a bearing marker, an annular compass card surrounding said viewing opening and cooperable with said marker, bearing selector means including means responsive to the sense of the waves propagated from said station for adjusting the relative position between said bearing marker and said compass card to thereby indicate the bearing of the radio beam toward said station relative to the heading of said aircraft, an aircraft reference index rotatably mounted in said housing for rotation about the center of said opening as an axis and cooperable with said compass card for indicating the heading of said aircraft, a substantially wedge-shaped pointer simulating by its shape the direction of propagation of the radio beam, a support member for said pointer mounted for rotation about said axis, means mounted on said support member and responsive to the magnitude and sense of displacement of said aircraft from said radio beam for correspondingly displacing said pointer substantially radially of said aircraft index, and means responsive to a reversal in the sense of said radio waves for rotating said support means substantially 180° upon passing of said aircraft over said station and for simultaneously reversing the sense of the displacement of said pointer, whereby to indicate to the pilot not only the position and heading of said aircraft relative to said beam but also the direction of travel of said aircraft both during its approach toward and during its departure from said station.

15. A radio navigation display instrument for enabling a pilot to maneuver an aircraft so as to approach and thereafter maintain the localizer and glide slope beams of a selected radio instrument landing system including a selector switch for selecting a desired instrument landing system frequency and simultaneously for supplying signals proportional to the magnitude and sense of displacement of said aircraft from said localizer and glide slope beams so selected, comprising an instrument housing having a viewing opening in a wall thereof, an aircraft reference index including means cooperable therewith for indicating the direction of travel of said aircraft, a pointer simulating by its shape direction of propagation of said localizer beam, means responsive to deviations in the heading of said aircraft from the bearing of said localizer beam for producing relative rotation between said reference index and said pointer about the center of said opening as an axis, means controlled in accordance with said localizer signal for correspondingly displacing said pointer substantially radially of said aircraft index whereby to indicate to the pilot not only the position and heading of said aircraft relative to said localizer beam but also the direction of travel of said aircraft relative to a direction of propagation of said localizer beam, a glide slope pointer adapted to be positioned above and below said reference index in response to said glide slope signal, and separate switch means responsive to actuation of said frequency selector switch for supplying said glide slope beam signal to said glide slope pointer, whereby to indicate to the pilot the position of said aircraft relative to said glide slope beam.

16. A navigation instrument for enabling a pilot to maneuver an aircraft so as to approach and thereafter maintain the localizer and glide slope beams of a selected radio instrument landing system including a selector switch for selecting a desired instrument landing system frequency and simultaneously for supplying signals proportional to the magnitude and sense of displacement of said aircraft from the localizer and glide slope beams so selected, comprising an instrument housing having a viewing opening in a wall thereof, a fixed aircraft reference index located substantially at the center of said opening including means cooperable therewith for indicating the direction of travel of said aircraft, a substantially wedge-shaped pointer simulating by its shape the direction of propagation of said localizer beam, a support member pivotally mounted in said instrument housing for supporting said pointer for rotation about said axis, means including bearing selector means for positioning said support member about said axis in accordance with deviations in the heading of said aircraft from the bearing of said localizer beam, pointer actuating means mounted on said support member and responsive to said localizer signal for displacing said pointer substantially laterally of said aircraft reference index whereby to indicate to the pilot the position and heading of said aircraft relative to said beam and also the direction of travel of said aircraft relative to the direction of propagation of said localizer beam, a glide slope pointer adapted to be positioned above and below said reference index in response to said glide slope signal, and separate switch means responsive to actuation of said selector switch for supplying said glide slope beam signal to said glide slope pointer whereby to indicate to the pilot the position of said aircraft relative to said glide slope beam.

17. A radio navigation display instrument for enabling a pilot to maneuver an aircraft so as to approach and thereafter maintain courses defined by selected radio beams propagated from selected stations, said aircraft having radio receiving apparatus for receiving radio waves representing said courses including radio range beams and localizer beams for providing lateral course information and glide slope beams for providing vertical course information, said beams being identified by predetermined station frequencies and said receiving apparatus having a frequency selector switch for selecting desired radio beam channels, said instrument comprising an aircraft reference index including means cooperable therewith for representing the direction of travel of said aircraft, a substantially V-shaped pointer simulating by its shape the direction of propagation of a selected lateral course beam, means for stabilizing said pointer at the bearing of said lateral course beam whereby to indicate the direction of travel of said aircraft relative to the bearing of said lateral course beam, means controlled by the output of said lateral course beam receiver for displacing said V-shaped pointer substantially radially of said aircraft index in accordance with the magnitude and sense of displacement of said aircraft from said lateral course beam whereby to indicate to the pilot the lateral position of said aircraft relative to said lateral course beam, a glide slope pointer adapted to be stowed out of view of the pilot and to be positioned in view of the pilot above and below said reference index in response to the magnitude and sense of the vertical displacement of said aircraft above and below a selected glide slope beam, and separate switch means controlled by said frequency selector switch for stowing said glide slope pointer when a radio range frequency is selected and for rendering said glide slope pointer responsive to said glide slope beam receiver when a localizer frequency is selected.

18. A navigation instrument for enabling a pilot to maneuver an aircraft so as to approach and thereafter maintain a selected course defined by a radio beam propagated from a selected station comprising an instrument housing in a viewing opening in a wall thereof, an aircraft reference index located substantially at the center of said opening and representing by its shape the direction of travel of said aircraft, a pointer simulating by its shape the direction of propagation of said radio beam, means for selecting the bearing of a radio course to be followed, a counter operated by said selector means and having a first scale for indicating to the pilot the bearing of the selected radio course and a second scale for indicating to the pilot the reciprocal of the bearing of said course, a positionable shutter for exposing one or the other of said scales, means responsive to deviations in the heading of said aircraft from the bearing so selected for producting relative rotation between said reference index and said pointer about the center of said opening as an axis, means controlled in accordance with the magnitude and sense of displacement of said aircraft from said beam for correspondingly displacing said pointer substantially radially of said reference index whereby to indicate to the pilot not only the position and heading of said aircraft relative to said beam but also the direction of travel of said aircraft relative to said radio beam station, and means controlled by the position of said shutter for controlling the sense of operation of said heading deviation responsive means and said pointer displacing means.

19. A navigation instrument for enabling a pilot to maneuver an aircraft so as to approach and thereafter maintain a selected course defined by a radio beam propagated from a selected station comprising an instrument housing having a viewing opening in a wall thereof, a fixed reference index located substantially at the center of said opening and representing by its shape the direction of travel of said aircraft, a substantially V-shaped pointer simulating by its shape the direction of propagation of the radio beam, a support member pivotally mounted in said instrument housing for supporting said pointer for rotation about said axis, means including bearing selector means for positioning said support member in accordance with the difference between the bearing of said radio beam and the magnetic heading of said aircraft, a counter operated by said bearing selector means and having a first scale for indicating to the pilot the bearing of the selected radio course and a second scale for indicating to the pilot the reciprocal thereof, a positionable shutter for exposing one or the other of said scales, pointer actuating means carried by said support member and controlled in accordance with the magnitude and sense of the displacement of said aircraft from said radio beam for correspondingly displacing said pointer substantially laterally of said reference index, whereby to indicate to the pilot not only position and heading of said aircraft relative to said radio beam but also the direction of travel of said aircraft relative to said radio beam station, and means controlled by the position of said shutter for controlling the sense of operation of said support member positioning means and said pointer displacing means.

20. A navigation display instrument for indicating the progress of an aircraft in its approach to and maintenance of a predetermined course defined by a radio beam propagated from a predetermined station comprising a pointer simulating by its shape the direction of propagation of said radio beam, an aircraft reference index adapted to indicate the direction of travel of said aircraft with respect to said beam, means responsive to deviations in the heading of said aircraft from the bearing of said predetermined course for producing relative rotation between said reference index and said pointer, and means controlled in accordance with the magnitude and sense of the displacement of said aircraft from said radio beam for producing relative lateral displacement between said reference index and said pointer whereby said instrument indicates not only the lateral position and heading of said aircraft relative to said radio beam but also whether the aircraft is proceeding toward or away from said radio beam station.

No references cited.